United States Patent [19]

Muller

[11] Patent Number: 4,911,258

[45] Date of Patent: Mar. 27, 1990

[54] CURVILINEAR FLEXIBLE VEHICLE DRIVE STRUCTURE AND METHOD

[75] Inventor: George H. Muller, Ann Arbor, Mich.

[73] Assignee: Coalpower, Inc., d/b/a Multipower, Inc., Ann Arbor, Mich.

[21] Appl. No.: 79,007

[22] Filed: Jul. 29, 1987

[51] Int. Cl.$^4$ ............................................. B60K 17/16
[52] U.S. Cl. ........................................ 180/76; 74/650;
 180/253
[58] Field of Search ...................... 180/76, 253; 74/650

[56] References Cited

U.S. PATENT DOCUMENTS

| 4,018,298 | 4/1977 | Frazee | 180/76 |
| 4,153,131 | 5/1979 | Sakata et al. | 180/253 |
| 4,184,575 | 1/1980 | Fogelberg | 180/253 |
| 4,650,028 | 3/1987 | Eastman et al. | 74/650 |
| 4,681,180 | 7/1987 | Oyama et al. | 180/76 |

Primary Examiner—Kenneth R. Rice
Attorney, Agent, or Firm—Dale R. Small & Associates

[57] ABSTRACT

Structure for and method of driving a motor vehicle including one or more curvilinear drive shafts including a multistrand flexible cable providing primary two wheel drive or permanent or selectively actuable four wheel drive with front or rear mounted power packs oriented North/South or East/West. Torque limiters and clutches are provided between the power pack, drive shafts and wheels and may be selectively actuated in desired sequence. The torque limiters provide torque differentiation between vehicle wheels rather than rotational differentiation and may be utilized for this feature with rigid drive shafts. In different embodiments of the invention, the rear wheels may be driven directly from two separate front to rear drive shafts which may cross each other and the transverse drive shaft may be eliminated. Also, a single curvilinear drive shaft extending over, under or through a vehicle gas tank may be provided between a vehicle power pack and a pinion, ring gear and differential rear axle assembly. The constant spring loaded torque limiter principle may apply to a front wheel drive vehicle, when interfaced in one of the driving front wheel half shafts, thus eliminating the conventional revolution differential action between the front wheels and allowing a selected traction on one wheel while the other wheel slips on low coefficient of friction pavement.

6 Claims, 8 Drawing Sheets

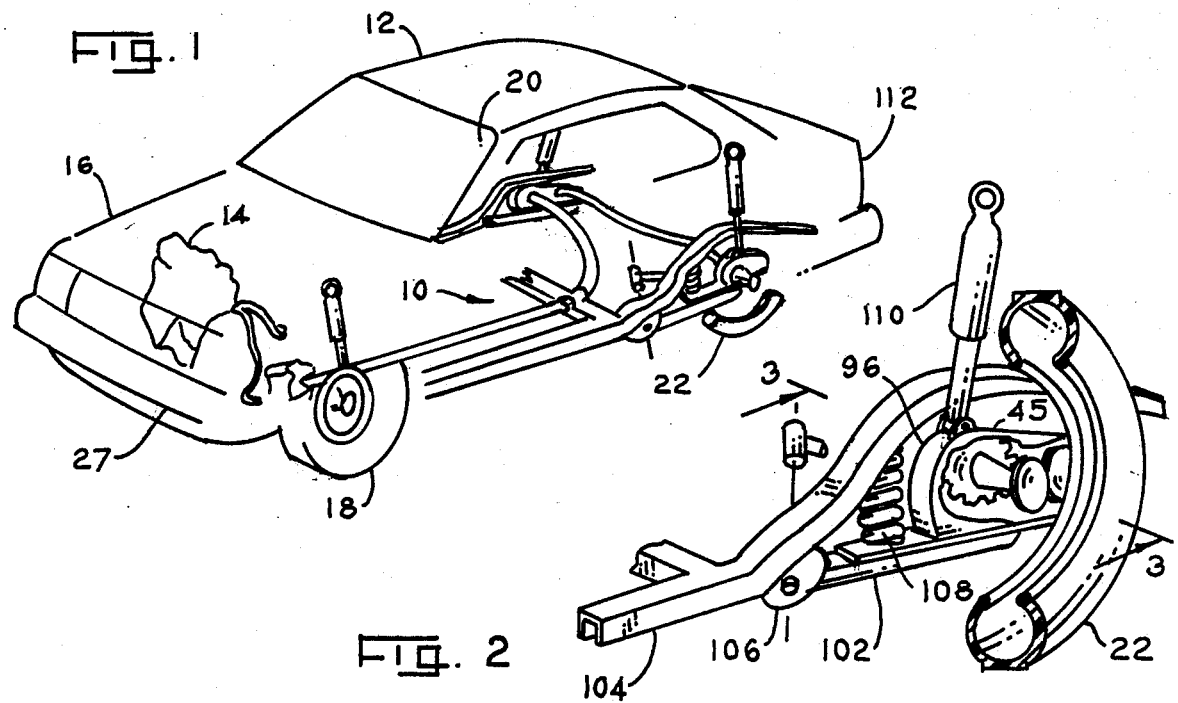
Fig. 1
Fig. 2
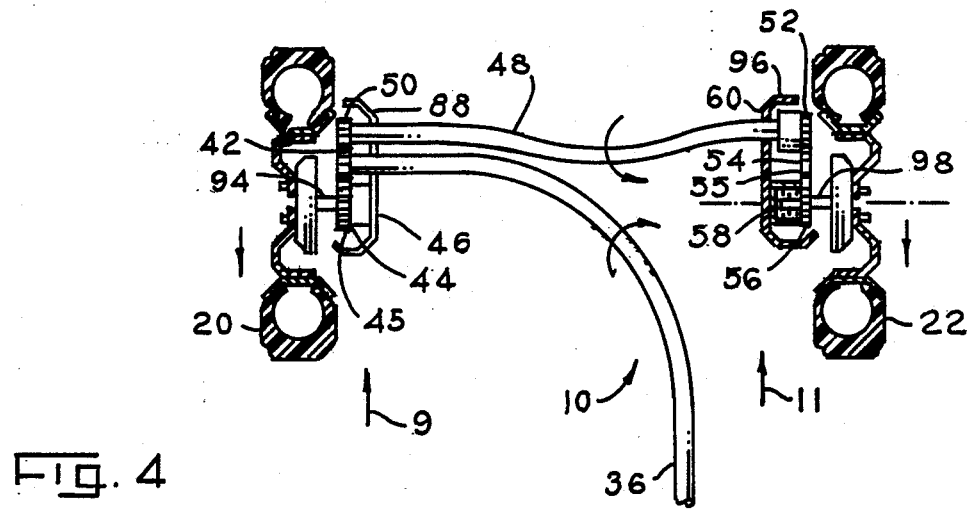
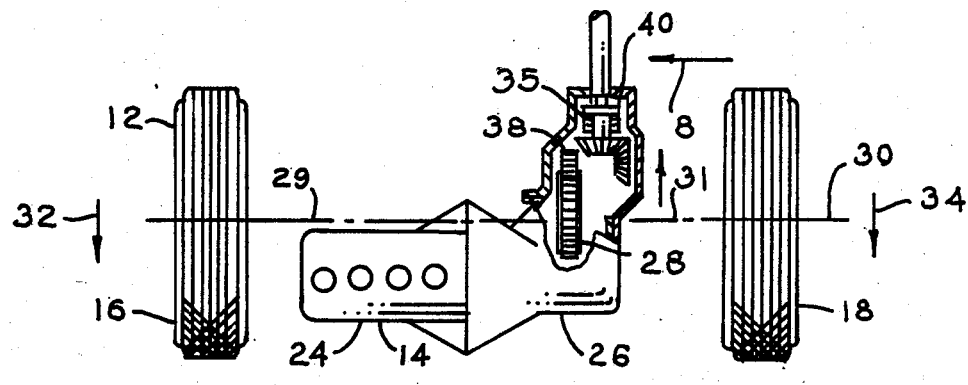
Fig. 4

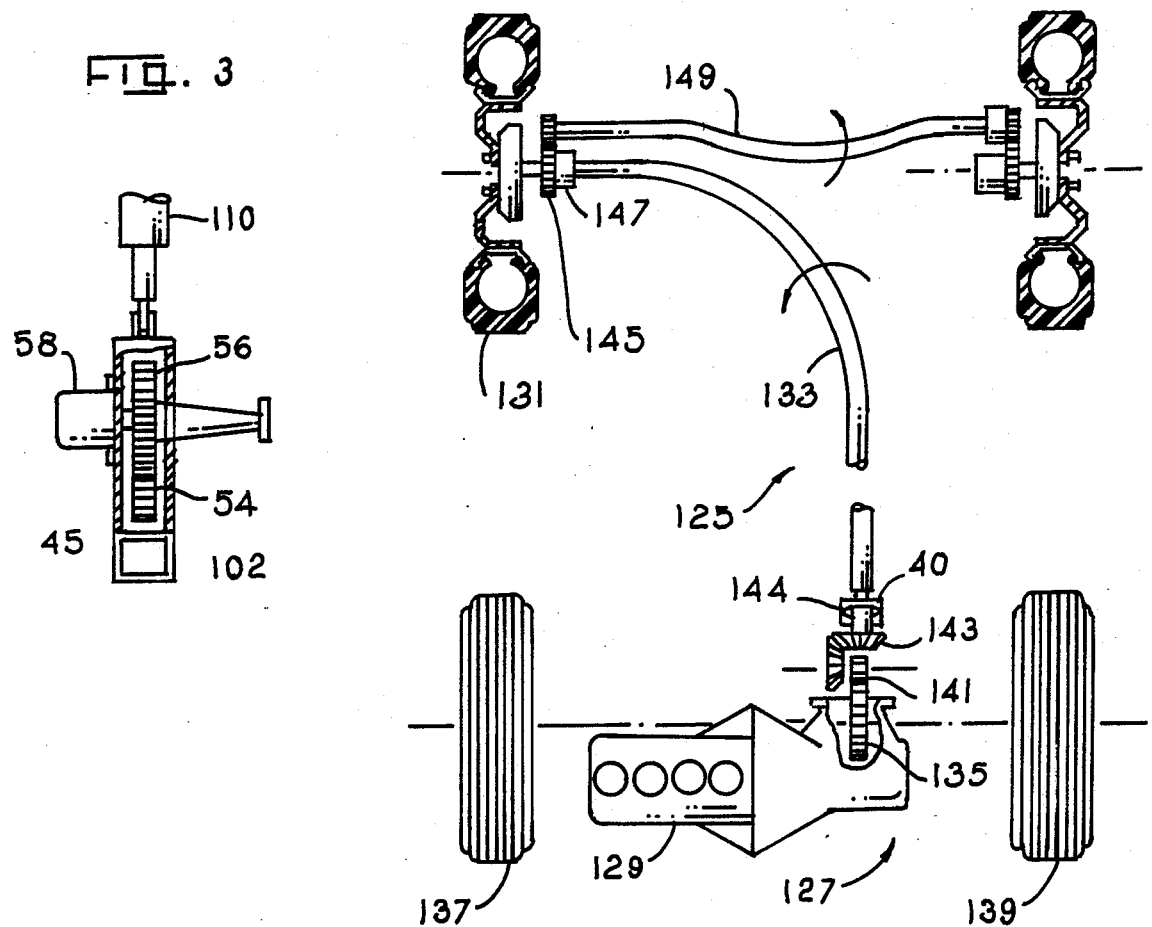
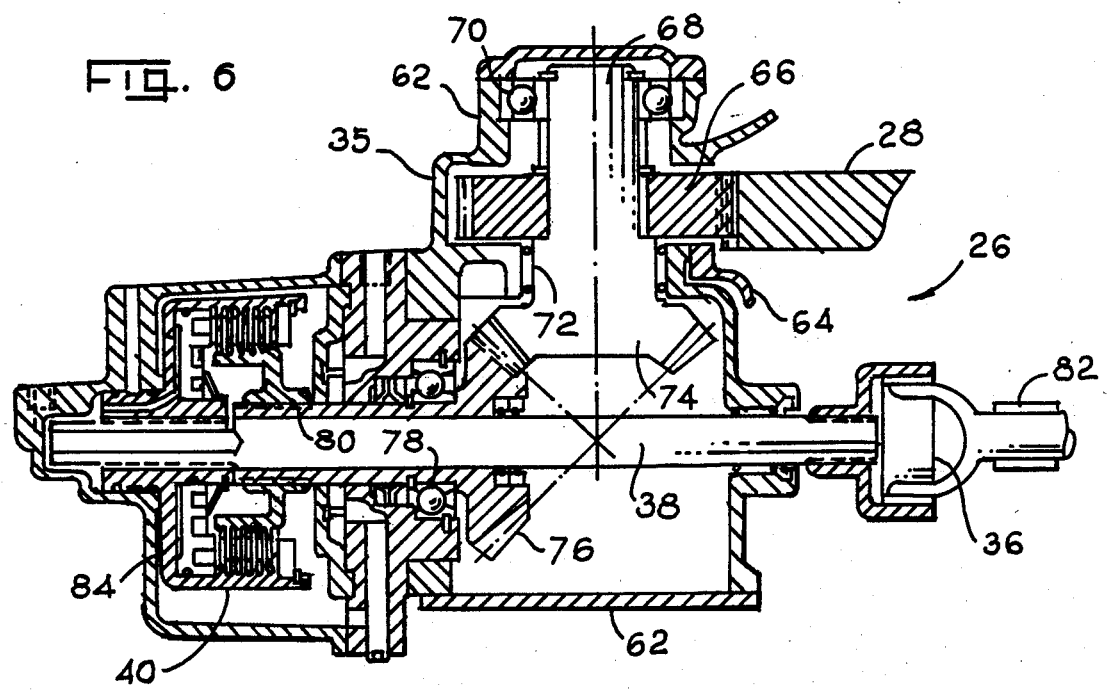

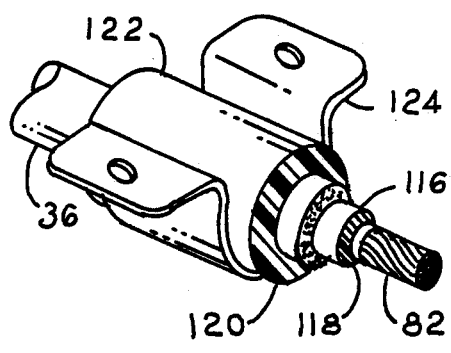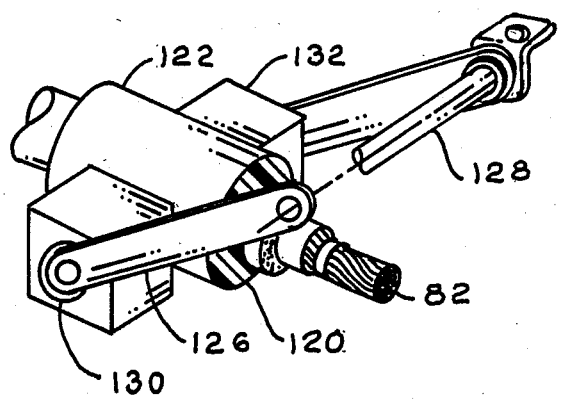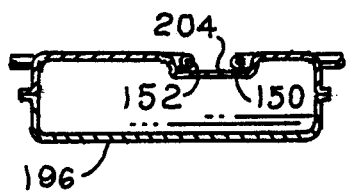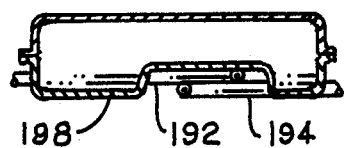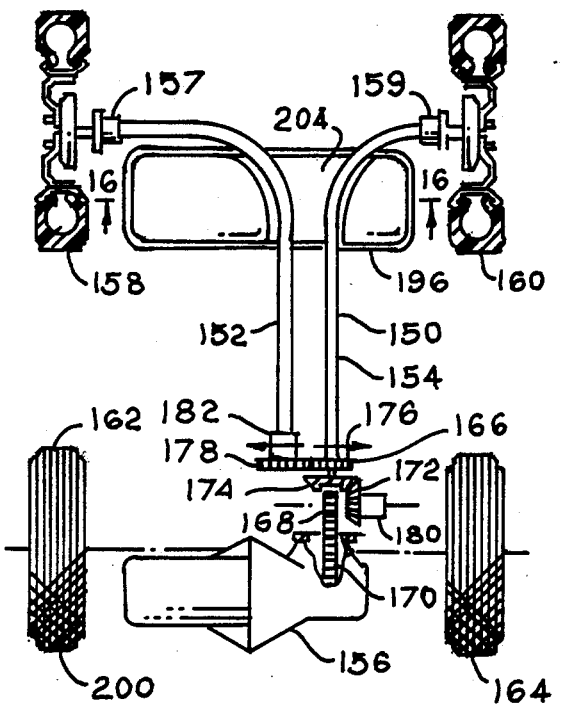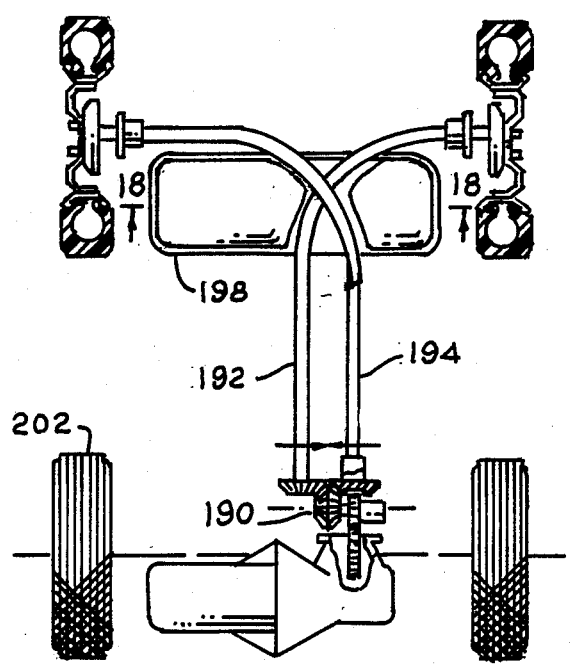

INPUT SHAFT TO OUTPUT SHAFT REVOLUTION RATIO

CURVILINEAR FLEXIBLE VEHICLE DRIVE STRUCTURE AND METHOD

BACKGROUND OF THE INVENTION

1. Field of the Invention

The invention relates to motor vehicles, and refers more specifically to curvilinear flexible drive structure for a motor vehicle having front or rear mounted transversely, or in line mounted, power packs for providing selectively activated or full time four wheel drive for the motor vehicle, or for providing conventional two wheel drive for the motor vehicle, and/or strategically located selectively or permanently activated torque limiting devices which are part of the motor vehicle's drive structure.

2. Description of the Prior Art

In the past, drive structures for motor vehicles having in line (North/South) front mounted power packs and rear wheel drive have included an elongated rigid drive shaft extending from the front mounted, in line, power pack to a rear differential and transversely extending rear half axles between the rear differential and the rear wheels.

Conventional front or rear wheel drive structures are also known wherein the power packs are positioned at the front of the vehicle for front wheel drive and at the rear of the vehicle for rear wheel drive vehicles. With such structures, the power packs are usually mounted transversely of the vehicles (East/West) and the wheels are driven directly through transaxles. In some such configurations, off set gearing driven by the differential gear has been utilized to drive the wheels at the same end of the vehicle that the power pack is mounted in.

Prior four wheel drive vehicles have alternatively included permanent four wheel drive systems or selectively actuated four wheel drive systems. With the selectively actuated four wheel drive systems, one of the vehicle's front or rear wheel sets are additionally driven only when a four wheel drive function is selected. Currently, conventional selectively actuated four wheel drive systems may include means for changing from two to four wheel drive while the vehicle is either standing still or moving. More recently, these systems have included conventional rotational differentiation combined with torque compensation, also called torque split, between front and rear drives as well, in some cases, as between left and right hand opposite wheels of one or more wheel driving axles.

The only known flexible cable drive structure for a motor vehicle is found in the U.S. Pat. No. 1,897,452 to West. In the West structure, a multistrand cable is utilized within a rigid longitudinal sleeve between a front mounted, North/South, vehicle power pack and the rear differential of the motor vehicle. A similar multistrand cable within a rigid cylindrical sleeve or transverse, East/West, housing is utilized to drive the two rear wheels of a four wheel motor vehicle from the rear differential by West.

West utilizes the multistrand cables in their linear configurations for their wind up capabilities to reduce torsional shock imparted to or coming from a rigid, longitudinal drive shaft and rear wheel axle shafts. West neither utilized nor makes any reference to the flexibility of his multistrand cables for permitting curvilinear installations of his drive shaft, including a curvilinear cable and sleeve, around underbody structure obstructions, exhaust components or gas tank, and improved drive line packaging for the sake of eliminating the drive line tunnel or obtaining a lower floor while maintaining a desired ground clearance or minimizing floor plan structure tooling changes when adding rear wheel drive to a front wheel drive existing production vehicle.

SUMMARY OF THE INVENTION

The invention is a structure for and a method of driving a motor vehicle with a curvilinear drive shaft through a flexible curvilinear cable. In accordance with the structure and method of the invention, the curvilinear drive shaft of the motor vehicle in a preferred embodiment is utilized to selectively drive the rear wheels of a motor vehicle having front wheels which are permanently driven by a power pack which is transversely mounted between the vehicle's front wheels.

In the preferred embodiment, a first, front to rear, separate, curvilinear drive shaft is positioned between the power pack and right rear wheel, which curvilinear drive shaft is rotated by the power pack and which in turn rotates the right rear wheel. A second, transverse, curvilinear drive shaft including a second multistrand curvilinear and flexible drive cable extends between the right and left rear wheels and is selectively driven by the front to rear drive shaft at the right rear wheel and selectively drives the left rear wheel. The symmetrical proposal is also valid. Thus, the front to rear drive shaft may drive the left rear wheel and the transverse drive shaft may drive the right rear wheel. Such symmetrical proposals may continue to apply within the invention in the descriptions to follow.

A front torque limiter is provided between the power pack and the front end of the front to rear drive shaft. A rear torque limiter is provided between the left rear wheel and the transverse drive shaft to provide torque differentiation between the rear wheel in turns rather than providing conventional revolution differentiation between the two rear wheels with or without torque differentiation. An optional clutch such as a dog clutch is provided between the rear end of the front to rear drive shaft and the right rear wheel. Further, when the torque limiter at the left rear wheel is set to a constant torque slip value to connect the two rear wheels, a left rear wheel clutch such as a dog clutch is provided between the transverse drive shaft and the constant torque limiter at the left rear wheel.

The clutches and torque limiters may be separately actuated. Further, in accordance with the invention, the torque limiter at the left rear wheel, the clutch at the left rear wheel, the clutch at the right rear wheel and the torque limiter at the power pack may be sequentially operated in any number of desired selected orders.

The curvilinear, flexible cable of the invention is a multistrand, large diameter braided cable of typically 0.75 to 1.25 inches in diameter, preferably of high strength steel, encased in a curvilinear outer conduit or casing that may be flexible or rigid as required over the length of the cable with a lubricant between the outer casing or conduit and cable and ferrules with seals at both ends of the conduit to retain the lubricant and prevent contamination. The outer conduit is further encased in a fully or partially tubular, compliant, insulating material.

In accordance with the invention, the curvilinear drive shafts are secured to the vehicle's floor or frame structure by several cylindrical, resilient members positioned around the conduit insulator of the drive shafts in axially spaced locations received in U-shaped brackets or hanger members such as shackles which may be pivotally and/or resiliently mounted.

The rear wheels of the motor vehicle may also be driven either directly by the curvilinear drive shaft or through a series of gears at both rear wheels and at the front end of the front to rear drive shaft which permit lower cable operating torques and in exchange require a desirable greater speed of rotation of the curvilinear, flexible, multistrand drive cable.

In other embodiments of the structure and method of the invention, the transverse drive shaft may be eliminated and both the left and right rear wheels may be directly driven from the power pack by two front to rear curvilinear drive shafts. The front to rear curvilinear drive shafts in different embodiments may be crossed or not crossed as seen in plan view between the power pack and the wheels driven thereby and may proceed over or under a vehicle gas tank located ahead of or between the rear wheels.

In still further embodiments of the invention, a single curvilinear drive shaft may be utilized between a front mounted, in line, power pack or transversely positioned power pack and a rear differential. With such embodiments, the curvilinear drive shaft also permits positioning of the flexible drive shaft either over or under or through a tube passing through the vehicle gas tank positioned at least partly ahead of the rear wheels. Wherein the drive shaft extends over or through the gas tank, multiple sump pumps (i.e. one on each side of the bottom gas tank tunnel) are avoided.

Separate torque limiters and/or clutches may also be used in conjunction with rigid North/South and/or East/West drive shafts in accordance with the invention to eliminate the usual rear differential and provide torque differentiation rather than the rotational differentiation of the past.

Many other embodiments and modifications of the structure and method of the invention are possible. Such embodiments and modifications may include an East/West power pack having the engine on the left hand side rather than the most common right hand side with its transmission therefor on the right hand side, the transmission being connected to and driving the flexible drive shaft or shafts.

BRIEF DESCRIPTION OF THE DRAWINGS

FIG. 1 is a perspective view showing a motor vehicle in phantom including curvilinear drive shafts constructed in accordance with the invention for effecting the method of the invention.

FIG. 2 is an enlarged broken away perspective view of the left rear wheel portion of the vehicle drive structure shown in FIG. 1.

FIG. 3 is an enlarged partial section view of the vehicle drive structure portion shown in FIG 2, taken substantially on the line 3—3 in FIG. 2.

FIG. 4 is an enlarged broken, diagrammatic and partially broken away plan view of the vehicle drive structure and associated vehicle parts illustrated in FIG. 1.

FIG. 5 is an enlarged partial plan view of a modification of the vehicle drive structure shown in FIGS. 1-4 for effecting a modified method of driving the vehicle.

FIG. 6 is a partly broken away plan view of the initial and earliest modification of the portion of the vehicle drive structure shown in FIGS. 7 and 8 having a front mounted torque limiter.

FIG. 13 is a perspective view of a portion of the curvilinear drive shaft of the invention including a multistrand flexible cable and bracket support structure therefore.

FIG. 14 is another perspective view of the curvilinear drive shaft of the invention shown in FIG. 13 with pivoted hanger or shackle support structure therefore.

FIG. 15 is a plan view of another modification of the vehicle drive structure shown in FIG. 1, including two front to rear curvilinear drive shafts and no transverse drive shaft.

FIG. 16 is a diagrammatic section view of the curvilinear drive shafts of FIG. 15, passing over the vehicle's gas tank, taken substantially on the line 16—16 in FIG. 15.

FIG. 17 is a plan view of still another modification of the vehicle drive structure shown in FIG. 1, including two front to rear curvilinear drive shafts which cross each other and no transverse drive shaft.

FIG. 18 is a diagrammatic section view of the curvilinear drive shafts of FIG. 17, passing under the vehicle's gas tank, taken substantially on the line 18—18 in FIG. 17.

DESCRIPTION OF THE PREFERRED EMBODIMENT

Figure 7:
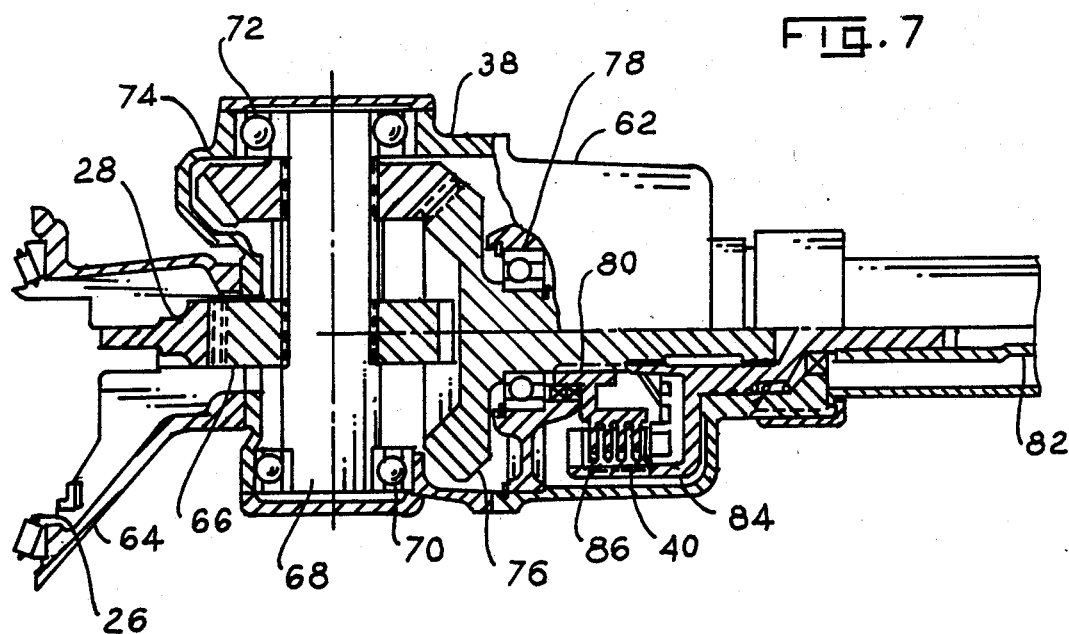
FIG. 7 is a partly broken away plan view of the vehicle drive structure portion shown in FIG. 8, taken in the direction of arrow 7 in FIG. 8.

The motor vehicle drive structure 10 of the invention as shown in FIG. 1 is installed in a motor vehicle 12. The motor vehicle 12 includes a front mounted, transversely oriented power pack 14 and right and left front wheels 16 and 18 and right and left rear wheels 20 and 22.

As shown best in FIG. 4, the power pack 14 of the motor vehicle 12 includes an engine 24, transaxle structure 26 and output structure such as a conventional output differential ring gear or shaft 28 or alternatively a simple power pack output shaft. The power pack 14 is oriented transversely of the vehicle 12 at the front end thereof. Such orientation is known in the industry as East/West orientation.

The front wheel 16 and 18 of the vehicle 12 are driven directly with the ring gear 28 through half axles at 29 and 31 so that they rotate about the axis 30 as shown in FIG. 4 to move the vehicle 12 forward in accordance with the direction of arrows 32 and 34, indicating the direction of movement of the top of the wheels 16 and 18 as shown in FIG. 4.

The drive structure 10 for the rear wheels 20 and 22 of the vehicle 12 provides selective four wheel drive for the vehicle 12 and includes a front to rear curvilinear drive shaft 36 connecting the front drive structure 35 through the ring gear 28 and including a gear train 38 and torque limiter 40 with the right rear wheel 20 through the front to rear drive shaft output gear 42 and the right rear wheel drive structure 45 including right rear wheel driving gear 44 and its dog clutch 46 which engages and disengages the right wheel driving spindle 94.

A transverse, curvilinear drive shaft 48 is also part of the drive structure 10 of the vehicle 12 and includes at its rear right wheel driven end, a right transverse drive shaft output gear 42 and includes at its rear left wheel end, a left transverse drive shaft driving gear 52 engaged with an idler gear 54, which in turn is engaged with the left wheel driving gear 56 in the left rear wheel drive structure 55.

Figure 11:
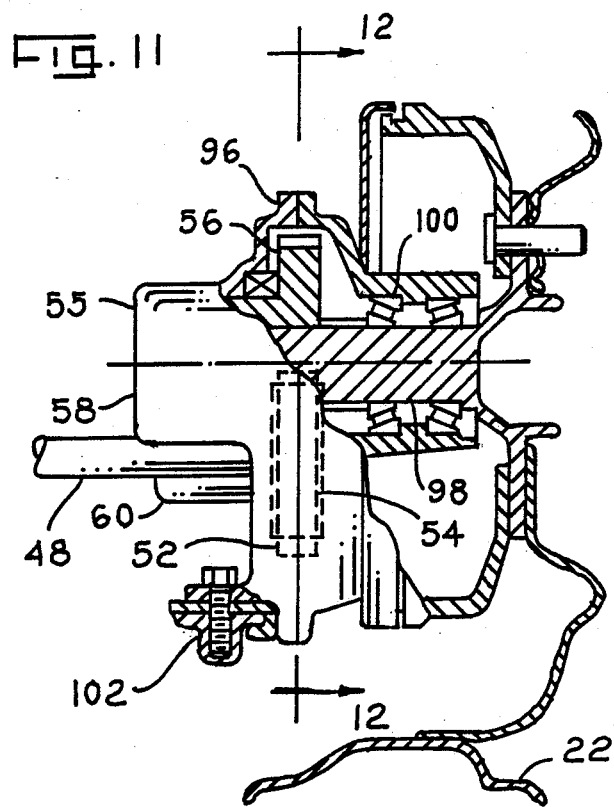
FIG. 11 is an enlarged partially broken away elevation view of the left rear wheel portion of the vehicle drive structure shown in FIG. 1, taken substantially in the direction of arrow 11 in FIG. 4.

A left wheel torque limiter 58 is positioned between the left wheel driving gear 56 and the left rear wheel driving spindle 98, as shown in FIG. 11.

The torque limiter 58, in some embodiments of the invention, may be a fixed value torque limiter, and as such may feature a spring pressed, multiple disc, wet clutch. The preloading spring may either apply a constant spring load or through an appropriate mechanism may initially allow a free wheeling condition and then quite rapidly build up the preload on the wet clutch to said fixed torque value. In such embodiments, a further dog clutch 60 is desirably positioned between the left end of the transverse drive shaft 48 and the left transverse drive shaft driving gear 52 as shown in FIG. 4.

The torque limiters 40 and 58, which may be known hydraulically or electrically activated torque limiters, and the dog clutches 46 and 60, which may be well known dog clutches, may be separately activated as desired or may be preprogrammed to be actuated in sequence. A preferred sequence is to actuate the torque limiter 58, dog clutch 60, dog clutch 46 and front torque limiter 40 when it is desired to provide rear wheel drive for the vehicle 12 in addition to the primary front wheel drive therefore regardless of whether vehicle 12 is at a stand still or in front wheel drive, driven motion.

Figure 8:
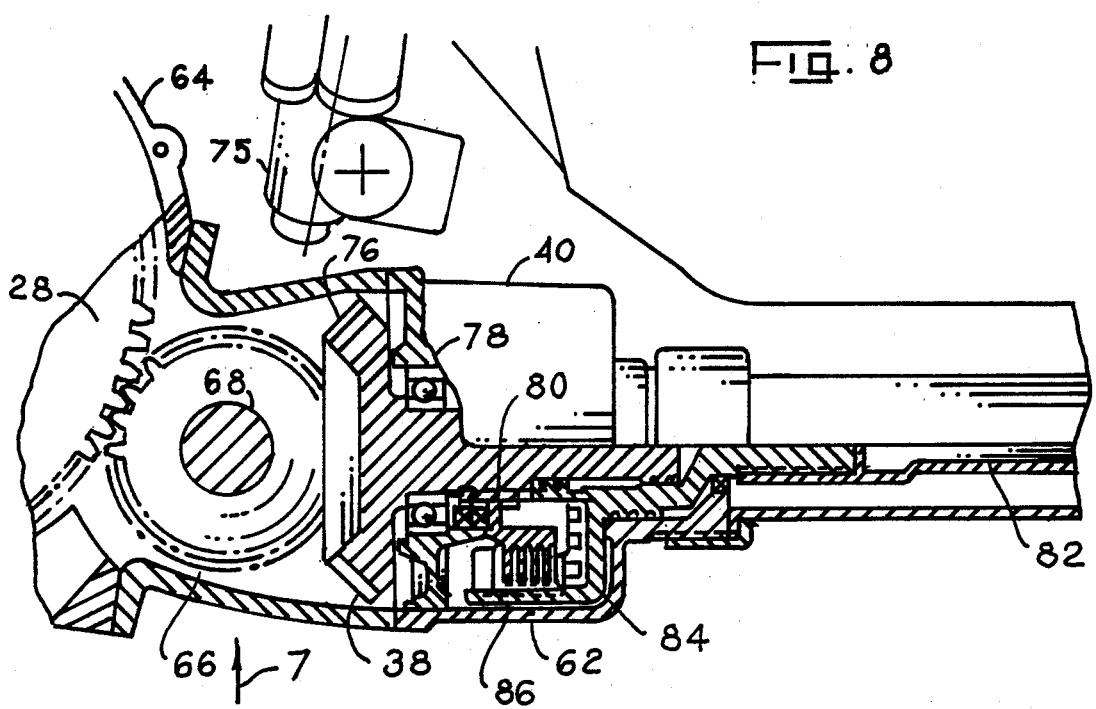
FIG. 8 is an enlarged partially broken away elevation view of a portion of the vehicle drive structure shown in FIG. 1, taken substantially in the direction of arrow 8 in FIGS. 4 and 7 and having a rear mounted torque limiter required due to space limitations forward of the vehicle power pack.

More specifically, and as particularly shown in FIGS. 6, 7 and 8, wherein the same elements function in substantially the same way, the same elements are given the same reference numbers. The front drive structure 35 as shown in FIGS. 6, 7 and 8 includes the gear train 38 and torque limiter 40 which are retained in a housing 62 secured by convenient means such as bolts to the housing 64 of the transaxle 26 in which the ring gear 28 is positioned. The gear train 38 includes the drive gear 66, which is approximately one half the diameter of the ring gear 28 and which is mounted centrally on the shaft 68 for rotation therewith in the bearings 70 and 72 carried by housing 62. A bevel gear 74 is also mounted on the shaft 68 for rotation therewith on rotation of the drive gear 66 by the ring gear 28. The complementary bevel gear 76, which is engaged with bevel gear 74, forms a right angle drive with the bevel gear 74 and is mounted for rotation in the bearing 78 within the housing 62.

The bevel gear 76 is the input gear of the front to rear drive shaft 36 and is connected through a torque limiter 40 which as shown is a hydraulic clutch to the multi-strand cable 82, shown in FIGS. 6, 7, 8 and 13, within the drive shaft 36. The bevel gear 76 is connected to the central section 80 of the hydraulic clutch 40 while the flexible cable 82 is connected to the outer portion 84 of the hydraulic clutch 40.

Accordingly, in operation, on rotation of the ring gear 28, drive gear 66 is rotated to rotate shaft 68, which in turn rotates the bevel gear 74 and the right angle bevel gear 76 in mesh therewith. When the hydraulic clutch 40 is actuated so that the friction discs 86 thereof are pressed together, the flexible cable 82 within the front to rear drive shaft 36 is also rotated.

As will be understood by those in the automotive drive train art, the torque limiter 40 may be positioned in front of the gear train 38, at the rear of the gear train, or to either side thereof depending on space availability and other design requirements. Specifically as shown in FIG. 6, in the modified drive structure 35 which was the inventor's original concept of this portion of the drive structure, the torque limiter 40 is positioned in front of the ring gear 28 and the gear train 38 is arranged as shown in FIG. 6.

In the embodiment of the invention shown in FIGS. 1-4, 7, 8 and 9-14, the torque limiter 40 is mounted in back of the ring gear rather than in front of the ring gear 28 and below the rack and pinion steering structure 75. This arrangement is used when space limitations in front of the transaxle are adverse. However, the number of components, their function and their relationship in operation within the drive structure 35 is substantially the same in both front and rear located torque limiters in respect to the ring gear as explained above.

Figure 9:
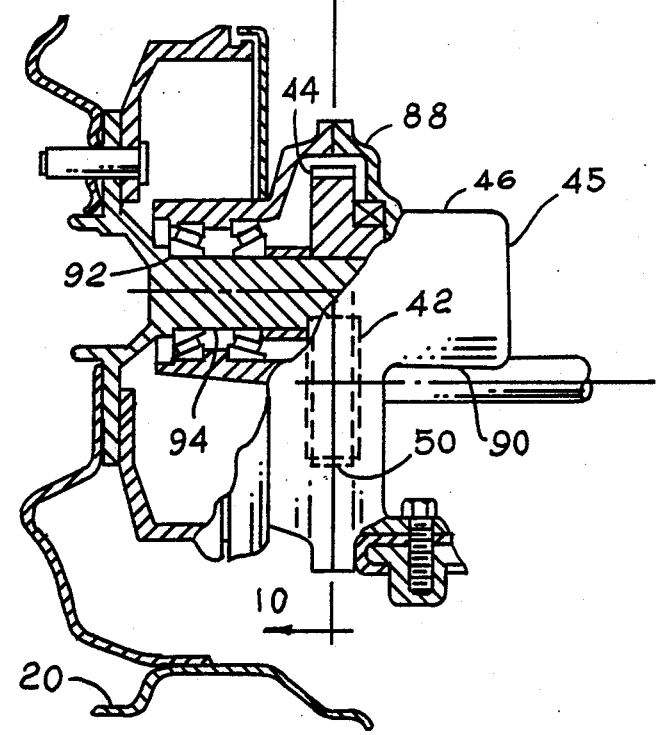
FIG. 9 is an enlarged partially broken away elevation view of the right rear wheel portion of the vehicle drive structure shown in FIG. 1, taken substantially in the direction of arrow 9 in FIG. 4.
Figure 10:
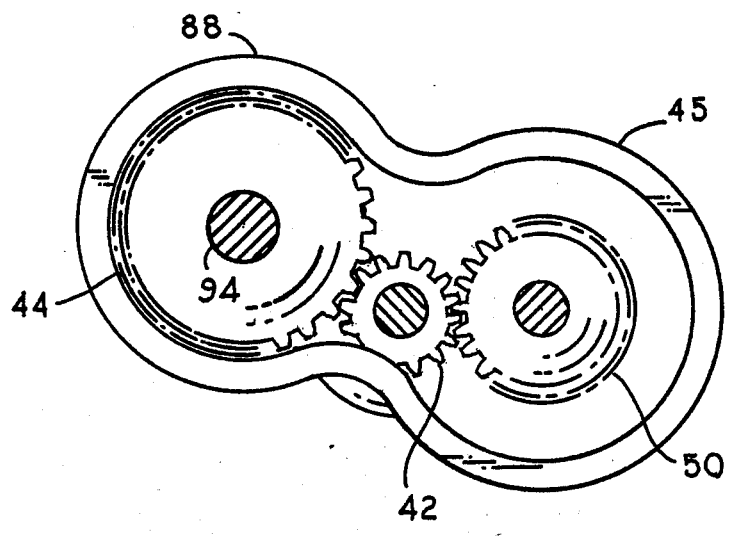
FIG. 10 is a partial section view of the vehicle drive structure illustrated in FIG. 9, taken substantially on the line 10—10 in FIG. 9.

The right rear wheel drive structure 45, shown in more detail in FIGS. 9 and 10, includes the housing 88 carried by a wheel suspension member, not shown. The rear end front to rear drive shaft output gear 42, best shown in FIG. 10, is mounted for rotation in the housing 88. The right rear wheel 20 is also rotatably mounted on the housing 88 by the bearings 92, as shown best in FIG. 9. The wheel gear 44 is adapted to be secured to the wheel spindle 94 for rotation therewith by clutch 46, and as shown best in FIG. 10, is in mesh with the front to rear drive shaft output gear 42.

The clutch 46 is a conventional dog clutch and serves to secure the wheel gear 44 and the spindle 94 of the wheel 20 together on actuation thereof. As with the torque limiter 40, the dog clutch 46 may be an electrically or hydraulically actuated dog clutch and may be individually actuated or may be actuated in any sequence with other clutches and torque limiters of the drive structure 10 of the invention.

Still, as shown in FIG. 10, the output gear 42 secured to the front to rear drive shaft 36 is one half the size of the wheel gear 44. Thus, with the ring gear 28 twice the size of the front drive gear 66 and with the right angle bevel gears 74 and 76 being of the same size, that is having a one to one ratio, the right rear wheel is driven at the same speed as the front wheels 16 and 18, which are driven directly by the ring gear 28 when the torque limiter 40 and the clutch 46 are energized.

Thus, the torque which would be applied to the drive shaft 36 will be one half the torque that would be present if the gear ratio between the gears 28 and 66 and between gears 42 and 44 was one to one. The speed of rotation of the multistrand flexible cable 82 of the drive shaft 36 will, however, be doubled. Such gear ratios are desirable to reduce weight, with a smaller diameter drive cable 82, and because of observed lower operating friction under such higher revolutions.

Figure 12:
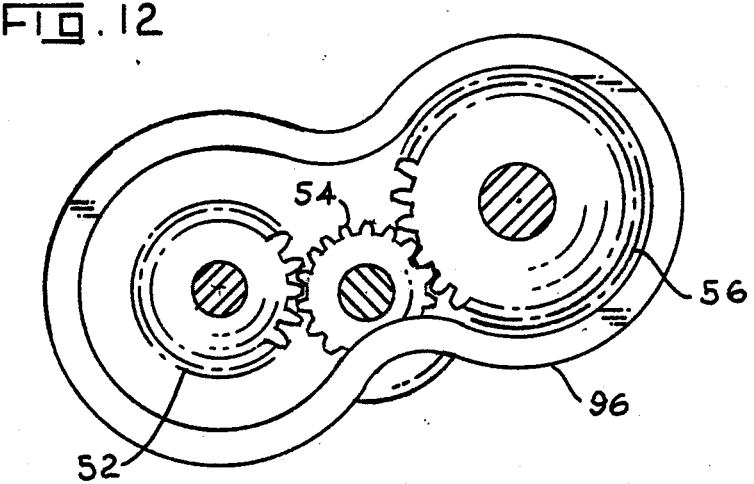
FIG. 12 is a partial section view of the vehicle drive structure illustrated in FIG. 11, taken substantially on the line 12—12 in FIG. 11.

As shown best in FIGS. 4, 10 and 12, the gears 50 and 52 which are secured to the right and left ends of the transverse curvilinear drive cable 48 are mounted for rotation in the housings 88 and 96 respectively, and are of the same size. The right gear 50 at the right end of the transverse drive shaft, next to the right hand wheel, is in mesh with the output gear 42 on the rear end of the front to rear drive shaft 36, and the left gear 52, which is of the same size as the gear 50 and which is located at the left end of the transverse drive shaft 48, is also in mesh with the idler gear 54, which again is supported for rotation in the housing 96. The idler gear 54 is thus driven at the same speed and in the same direction as the output gear 42 at the right hand rear end of the drive shaft 36.

The idler gear 54 is engaged with the left wheel driving gear 56, as shown best in FIG. 12. Again, the wheel driving gear 56 is twice as large as the idler gear 54, whereby the left hand wheel 22 is driven at the same speed as the right hand wheel 20, and both wheels 20 and 22 are driven at the same speed as the front wheels 16 and 18, and all rotated in the same direction by the nature of the wheels' opposition and rotational relations.

The left wheel drive structure 55, as shown best in FIGS. 11 and 12, further includes a torque limiter 58 centered on the wheel spindle 98 and the wheel driving gear 56. The wheel spindle 98 is supported for rotation by the bearings 100 in both halves of the housing 96.

The torque limiter 58 is interposed between the wheel driving gear 56 and the spindle 98 and again may be electrically, hydraulically or mechanically (or a combination of these) actuated.

Alternatively, the torque limiter 58 may feature a spring pressed, multiple disc wet clutch system torque limiter whereby torque is limited by the specific pressure of a spring against two or more pairs of preferably wet mating discs which slip relative to each other at torque applied between the spindle 98 and the driving gear 56 at and above a predetermined torque.

When the torque limiter 58 is of a fixed torque type, the additional dog clutch 60 may be provided between the gear 52 and the left end of the multistrand flexible transverse cable of the drive shaft 48. The dog clutch 60 is not needed if the torque limiter 58 is not of a fixed torque value type. Again, the torque limiter 58 or the dog clutch 60 may be individually actuated or may be actuated in a predetermined sequence with the right hand wheel dog clutch 60 and the front end torque limiter 40 to provide four wheel drive for the vehicle 12.

Conversely, when the front end torque limiter 40, the dog clutch 46 and the dog clutch 60, or when applicable the left hand torque limiter 58, have been disengaged in chosen sequence (i.e. torque limiter 40 first, then clutch 46 followed by clutch 60 or torque limiter 58) both the front to rear and right to left drive shafts 36 and 48 are inoperative along with many of the drive train gears, thus limiting frictional parasitic losses of the drive system of the invention while operating the vehicle 12 in front wheel drive mode only.

When it is desired to initiate four wheel drive in accordance with the method of the invention, the torque limiter 58 is actuated to secure the wheel spindle 98 to the wheel gear 56, if the torque limiter 58 is not a constant torque, torque limiter. If the torque limiter 58 is of the constant torque type and a dog clutch 60 is provided, the dog clutch 60 is engaged to cause rotation of the transverse shaft 48 and concurrently the front to rear drive shaft 36. If there is no clutch 60, the shaft 48 will rotate on remote actuation of the torque limiter 58. The dog clutch 46 is actuated to secure the wheel gear 44 to the wheel spindle 94 and the torque limiter 40 is actuated to connect the bevel gear 76 to the front to rear drive shaft 36 in sequence, and the four wheel drive mode of the vehicle 12 is activated.

As shown best in FIGS. 2 and 3, where a typical independent rear suspension is shown, the left wheel drive structure 45 shown in detail in FIGS. 11 and 12 includes the housing 96 mounted on a wheel suspension member 102 pivotally secured to the frame 104 of the vehicle by pivot structure 106 for vertical pivotal movement. The vertical movement of the wheel suspension member 102 is limited and cushioned by the spring means 108 and the strut type shock absorber member 110 positioned between the wheel suspension member 102 and frame 104 and between the housing 96 and body 112 of the motor vehicle 12 respectively.

As shown best in FIG. 13, the front to rear drive shaft 36 includes a flexible multistrand drive cable 82 within a cylindrical outer covering or conduit 116, which may be rigid and contoured specifically as shown or which may be pliable and flexible. Lubricating material 118 is provided between the multistrand flexible drive cable 82 and the outer conduit 116. An outer insulating cylindrical sheath 120 is provided over the outer conduit 116 which may be of a closed cell polymer construction and functions to protect the passenger compartment of the vehicle 12 from vibrations produced by the cable 82 within the outer conduit 116 because it prevents direct contact between the cable 82 and the passenger compartment lower structure. Further, it protects the outer conduit 116 from excess road or exhaust heat, chemicals, physical blows from loose objects and the like.

As shown in FIG. 13, a softer cylindrical ring 122, which may be of rubber or suitable resilient plastic, is positioned around the drive shaft 36 in appropriate axially spaced apart locations therealong. The drive shaft 36 may then be secured to the floor or frame structure of the vehicle 12 by means of appropriate U-shaped brackets 124, as shown in FIG. 13. Alternatively, or in addition, to guide and support the rubber rings, pivotal mounting hangers or shackles 126 may be provided, as shown best in FIG. 14.

In FIG. 14, wherein the portion of the cable drive shaft that moves with the rear end attached to the right rear wheel drive structure 45 is shown, the shackles 126 are pivoted about axis 128 and are connected to the automobile frame by means of insulating, elastomeric bushings and pivots. They also include the resilient pivot connections 130 at the lower end thereof connected to brackets 132 which surround soft resilient rings 122 in turn surrounding the drive cable conduit 116 of the drive shaft 36.

The structure for and method of mounting the transverse drive shaft 48 can be the same type as the structure for and method of mounting the drive shaft 36.

The above specifically disclosed embodiment of the flexible drive structure 10 for a motor vehicle 12, wherein curvilinear drive shafts including multistrand flexible cables are utilized to provide selective four wheel drive for a motor vehicle 12 having a transversely oriented front mounted power pack and front wheel drive, has the particular advantage of inexpensively adding a four wheel drive option to existing front wheel drive vehicle models.

The structure specifically disclosed above including the drive structure of the invention may also increase the interior package of the motor vehicle 12 due to low tunnel requirements allowed by the curvilinear drive shafts with their ability to be placed in convenient locations beneath the vehicle.

Further, the curvilinear drive structure of the invention saves weight and potentially improves the rear end crash performance of the vehicle in which it is installed in comparison to rigid drive shaft four wheel drive option structure currently available wherein the shaft interferes with vehicle structure crushability.

While one embodiment of the curvilinear drive shaft structure and method of the invention has been set forth above, it will be understood that other embodiments and modifications of the invention are contemplated.

Thus, as shown in FIG. 5, the modified curvilinear drive shaft structure 125 of the invention may be utilized to directly drive the right rear wheel of a motor vehicle 127 from a front mounted power pack 129. As shown in FIG. 5, the right rear wheel 131 of the motor vehicle 127 may be directly driven from the front to rear drive shaft 133 from the ring gear 135, which ring gear also directly drives the front wheels 137 and 139, through the gear train 141 as shown whereby the front, front to rear drive shaft gear 143 is driven in the opposite direction. The front to rear drive shaft 133 then directly drives the right rear wheel drive gear 145 through the dog clutch 147.

In such structure, the gear 42 and the idler gear 54 of the embodiment of the invention illustrated in FIG. 4 are eliminated and the torque on the flexible drive cables 133 and 149 will be twice the torque on the drive cables 36 and 48 shown in FIG. 4, or exactly the same as the ring gear torque. Furthermore, the drive cables will be rotated at one half the speed that they are in the embodiment of the invention shown in FIG. 4, that is, at the same speed as the ring gear and therefore the front wheels. This arrangement is particularly suitable for sma-1 light vehicles equipped with low torque engines.

Further, as shown in FIG. 15, the motor vehicle drive structure 10 may take the form of separate curvilinear drive shafts 152 and 154 extending between the front mounted transversely oriented vehicle power pack 156 and the rear wheels 158 and 160 of the motor vehicle 162.

In the embodiment of the invention shown in FIG. 15, the gear train 166 is such that the drive gear 168 driven by the ring gear 170 and right angle bevel gears 172 and 174 are driven so that they move to drive the front drive shaft gears 176 and 178 as shown. Torque limiters 180 and 182 are provided between the drive gear 168 and the bevel gear 172 and between the front drive shaft gear 178 and the drive shaft 152. The wheels 158 and 160 are directly driven through the two dog clutches 157 and 159.

This modification of the invention eliminates the transverse curvilinear drive shaft at the rear of the vehicle and most of the mechanism at the rear of the vehicle at the expense of a slightly longer total length of drive shaft required to provide two parallel curvilinear drive cables extending from the front to the rear of the vehicle as shown in FIG. 15 and a slightly more complicated transfer gear box case and an additional torque limiter at the front of the vehicle. Also, front weight distribution of the vehicle may be enhanced by the structure shown in FIG. 15. Rear suspension unsprung mass would also be reduced on account of elimination of the rear wheel drive gears.

As shown in FIG. 17 with a slightly modified gear train 190, the structure of FIG. 15 may also be modified to provide a greater radius of curvature for the curvilinear drive shafts 192 and 194 extending from the front to the rear of the vehicle because they are crossing each other.

Further, as shown in FIGS. 16 and 18, the curvilinear drive shafts 150, 152, 192 and 194 may be positioned either above or below, that is may extend over or under, the gas tanks 196 and 198 in the vehicles 162 and 202. It will be understood that with the drive shafts 150 and 152 extending over the gas tank 196 in a valley 204 in the top thereof, that saddle tanks, as shown in FIG. 18 wherein the curvilinear flexible drive shafts 192 and 194 extend under the gas tank, are not required. Gas tank 196 is desirable since separate pumps and/or conduits extending between the halves of the saddle tank are not necessary when the valley 204 is placed in the top of the tank.

Figure 19:
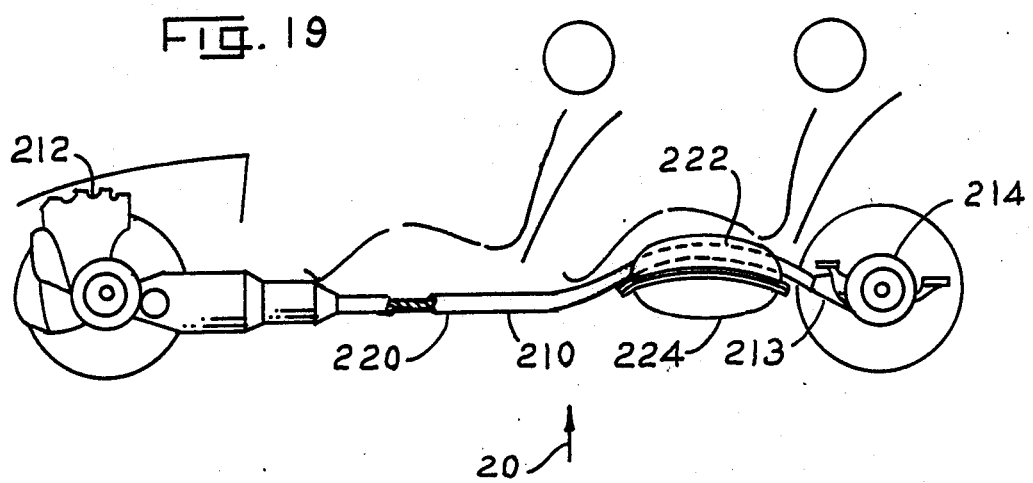
FIG. 19 is a diagrammatic elevation view of a motor vehicle having a transversely positioned front mounted power pack and a curvilinear drive shaft in accordance with the invention extending between the power pack and a rear pinion ring gear and differential assembly over the gas tank.
Figure 20:
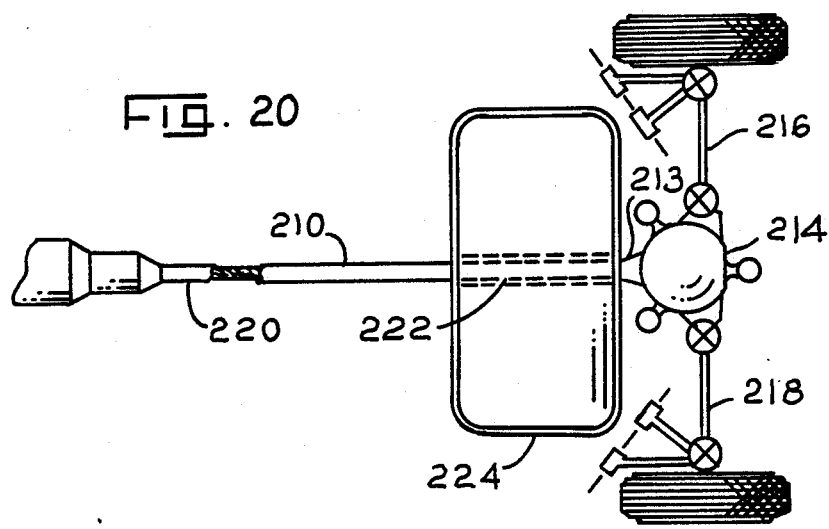
FIG. 20 is a partial bottom view of the motor vehicle shown in FIG. 19, taken in the direction of arrow 20 in FIG. 19.

Further, as shown in FIGS. 19 and 20, curvilinear drive shaft structure may be utilized to provide an appropriate flexible drive between a transversely oriented, front wheel drive front mounted power pack 212 and a conventional rear wheel drive through a rear pinion and ring gear carrier assembly with a differential 214 and half axle shafts 216 and 218. With such structure, it will be understood that a portion as the portion 220 of the curvilinear drive shaft 210 may be rigid, and a portion 222 thereof may be flexible. The flexible portion 222 of the drive shaft 210 may pass over or under the gas tank 224 in a valley therein as shown, which gas tank is located in front of the rear carrier assembly. Again, as set forth above and as shown in FIG. 19, the passing of the curvilinear drive shaft over the gas tank 224 eliminates the necessity for separate pumps or connecting lines required with the conventional saddle tanks having a passage through which a rigid drive shaft extends beneath the gas tank. Also as shown in FIG. 19, the front 213 of the rear carrier assembly is oriented upward and forward to meet the curvilinear portion 222 of the flexible drive shaft 210. Two rear seat passengers would be sitting on either side of the drive shaft.

Figure 22:
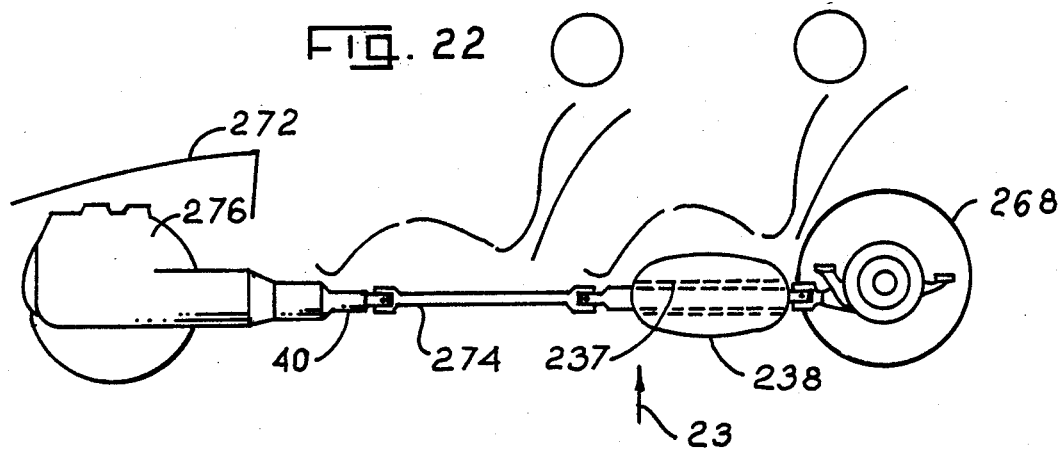
FIG. 22 is an elevation view of a motor vehicle having an in line positioned front mounted power pack and drive structure including a North/South drive shaft of rigid sections, one of which extends through the vehicle gas tank to a rubber insulated rear pinion and ring gear assembly without a rear differential but with half axles and appropraitely placed torque limiters and/or clutch functions between the front power pack and drive shaft on one hand and between the two rear wheels on the other.
Figure 23:
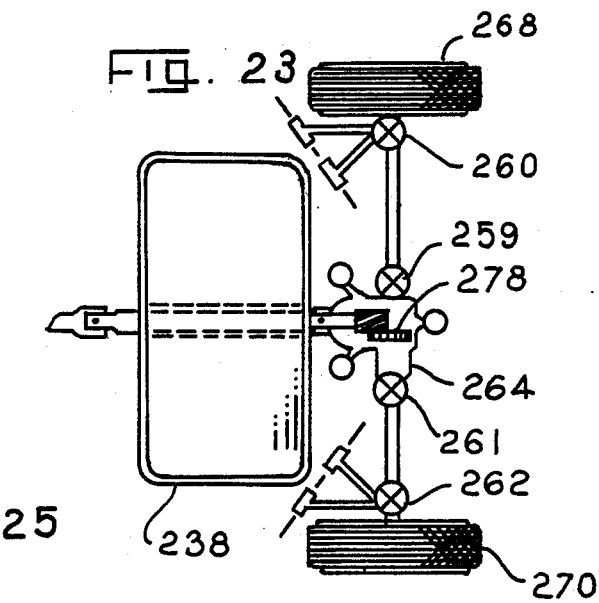
FIG. 23 is a partial plan view of the vehicle shown in FIG. 22, taken in the direction of arrow 23 in FIG. 22.

The above arrangement could also be achieved with multiple conventional rigid tubular drive shafts in series and interconnected with constant velocity or universal (cardan) type joints, whereas the rigid drive shaft (shafts) is (are) packaged through a tunnel 237 constructed within the gas tank 238 without the need of more than one sump pump, as shown in FIGS. 22 and 23. A flexible shaft (not shown) may be used as well.

Figure 21:
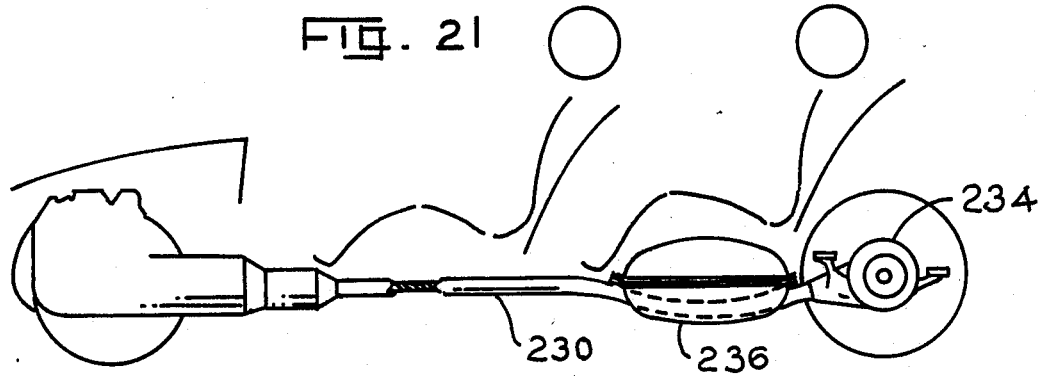
FIG. 21 is an elevation view of a motor vehicle having an in line (North/South) positioned front mounted power pack and a curvilinear drive cable in accordance with the invention extending under the gas tank between the power pack and a rear pinion, ring gear and differential assembly.

As shown in FIG. 21, a curvilinear drive shaft 230 may also be provided between a conventional in line or North/South power pack and a rear differential 234, if desired, with the same ability to extend over or under the gas tank 236 or through the gas tank 238 and is shown extending under the gas tank in FIG. 21.

As mentioned above, the drive shaft may also extend through the gas tank 238, in a manner similar to that disclosed in the Muller U.S. Pat. No. 3,213,958, where it extends through a tube positioned transversely in the crank case of a North/South oriented engine. In such a modification, as shown in FIGS. 22 and 23, the angle of the connection of the drive shaft to the rear pinion and ring gear carrier assembly with or without a differential may be greatly reduced as well as the height of the separation between the two passengers sitting on either side of the drive shaft. Again, this can be achieved according to the invention with a tubular rigid drive shaft in combination with universal or constant velocity joints. Tunnel 237 may be low enough to allow three passengers over the tank.

As shown in FIG. 23, the use of constant velocity or cardan joints 259, 260, 261 and 262 and torque limiter 264 between the right hand wheel 268 and left hand wheel 270 of the vehicle 272 in conjunction with conventional drive shafts 274 and between the power pack 276 and rear drive structure 278, which may be a simple pinion and ring gear structure without differential, is also contemplated within the scope of the invention. The advantage of the structure is the reduction in size and weight of the vehicle rear drive structure through elimination of the rear differential and the use of torque differentiation rather than rotational differentiation between the driven vehicle wheels. Improved drive line ground clearance is concurrently obtained in front of and under the gas tank.

In addition, it will be understood that wherein the drive structure of the invention has been indicated to provide selective or permanent four wheel drive for motor vehicles, that it may be utilized to provide the prime two wheel drive of a motor vehicle instead of a drive for the additional wheels in a four wheel drive vehicle.

Also, it is within the scope of the invention to provide either prime or front wheel four wheel drive from a rear mounted, in line or transversely oriented power pack through a modification of the structure as specifically set forth above which can be accomplished by those skilled in the art in view of the disclosure herewith.

Also, the flexible, curvilinear drive shafts of the invention may be connected directly to the steering road wheels of the invention owing to the flexibility of the drive shaft and the consequent ability of the drive shaft to follow the steering movement of the wheels without the need for universal or constant velocity joints with axially sliding structure of a conventional front wheel drive gear, ring gear and transfer drive assembly and sliding half shafts, one for each wheel.

For all applications and variations in configuration of the invention described herein, torque limiters have been included. These limiters may particularly meet the following output torque slippage in relation to the input shaft torque as more specifically described in FIG. 24.

Figure 24:
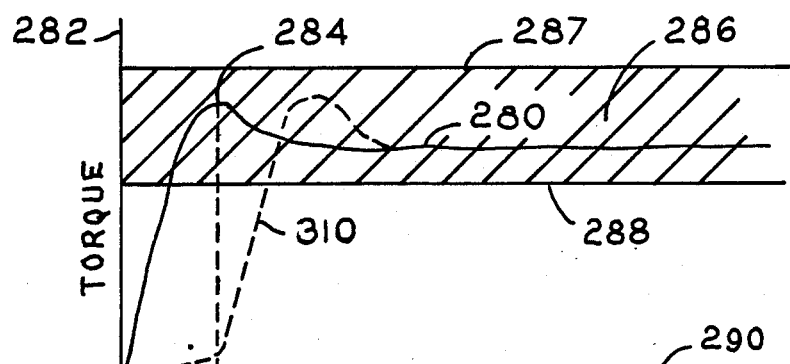
FIG. 24 shows through a graph that for increasing input shaft torque, the output shaft torque remains nearly constant within a certain torque differentiation (range) value and vise versa as one rear wheel must rotate more than the other, as happens in s sharp turn, for example.

As the input shaft torque increases over the variable range of its revolution, the output shaft of the torque limiter follows the same revolution, its output torque 280 increasing after a small slippage as shown in the abscissa 290 of the graph in FIG. 24, allowing only a small slippage, the ratio of input shaft revolutions to output shaft revolutions given in the abscissa, a value close to unity 283.

Once a selected input torque range 286 is reached, full slippage is occurring between input and output shafts, allowing the ratio of input to output shaft revolutions to continuously increase, as the output shaft slips in relationship to the input shaft as programmed by the torque limiter clutch system, either through hydraulic pressure being decreased between its wet clutch elements 40 as shown in FIG. 6, or because it was set not to exceed a certain value by means of a preloading spring as previously considered.

Whenever the output shaft slips in relationship to the input shaft, the wet clutches material, the fluid within which they operate and the pressures exerted on the clutch discs determine a torque band slip value 286 within which the slippage is assured to fluctuate as planned, the slippage converting its input energy into heat that is rejected through conventional means, i.e. direct contact between the clutches fluid and the finned torque limiter housing or by circulation of said fluid through a pump and remote cooling heat exchanger.

Figure 25:
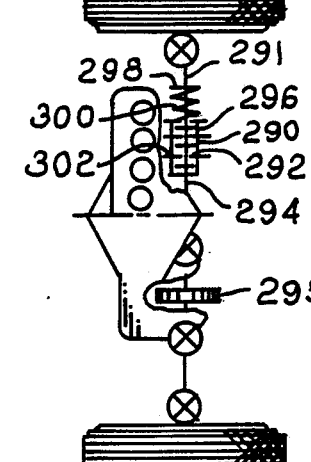
FIG. 25 is a partial plan view of a motor vehicle having conventional front wheel drive and a torque limiter in one of the half axles also for providing torque differentiation rather than rotational differentiation to compensate for different wheel travel distances.

It is understood that the process may be reversed and that the output shaft may provide the input shaft torque value, the slippage occurring through the clutch system as before and allowing the former input shaft to slip in its turn. These torque variation (differentiation) reversals will particularly occur between the rear wheels of a four wheel drive system as shown in FIGS. 5, 20 or 23. They may simply occur in a conventional front wheel drive vehicle 289 that includes, in the present invention, as shown in FIG. 25, its own torque limiter 290 between the front driven wheels 283 and 285. In the vehicle 289, the conventional rotational differences of the differential unit, generally attached to the differential gear, is replaced by a torque limiter 290 of the type providing the slippage function described herein. The torque limiter 290 in this case as located on the right hand longer half shaft may replace a conventional gear differential normally attached to the differential ring gear 295 which, combined, drive separately each front wheel half shaft. Thus, having eliminated the front differential altogether, the ring gear 295 drives each front wheel half shaft and the torque limiter 290 installed onto the most accessible half shaft, which is generally the right hand half shaft 291 as shown in FIG. 25. The torque limiter 290, outer clutch discs 292 are connected to one portion of the right hand half shaft 291, for example, the inner half shaft portion 294. The limiter inner clutch discs 296 are connected to the outer half shaft portion 298 of the half shaft 291. The inner and outer wet clutch discs could be preloaded by coil springs 300 to obtain the required front wheel torque differentiation through the torque limiter of which the slippage value is in the range 286 as shown in FIG. 24. The heat rejected by the slipping clutches 292 and 296 may be mostly dissipated by the fins 302 integral with the torque limiter body 290 as shown in FIG. 25.

In all of the embodiments of the invention disclosed above, the dog clutches are either engaged or disengaged. The torque limiters, however, are engaged when actuated in accordance with the graph of FIG. 24, wherein the ordinate is in torque (ft. lbs.) and the abscissa is in input wheel rotation units. Thus, when actuated, the torque transmitted through the torque limiters of the invention as indicated by line 280 rises rapidly as shown on the ordinate axis 282 and reaches a peak at point 284 on line 280 after which it decreases to a sustained ordinate value 286 between acceptable limits as shown by lines 287 and 288 until the torque limiter is deactuated. A higher torque input than that of point 284 and torque shown on line 280 after point 284 causes slippage of the torque limiter without damage.

This slippage of the output shaft of the torque limiter at its higher torque value 280 could also be reached through an appropriate mechanism providing initially free wheeling for one or more turns between the input shaft and the output shaft. Such operation would provide an alternative graphical relationship between torque output and wheel rotation illustrated by line 310 in FIG. 24. The appropriate mechanism could, for example, be a threaded portion of the input shaft operable within a sliding cap on another portion of the input shaft whereby the two portions of the input shaft are locked together only after initial rotation is allowed therebetween. Alternatively, progressive preloading of the torque limiter could be obtained hydraulically.

It is the intention therefore to include all modifications and embodiments of the invention as are defined by the appended claims within the scope of the invention.

I claim:

1. A motor vehicle including a front wheel drive power pack, a plurality of driven steering road wheels spaced apart at least one of transversely and longitudinally of the vehicle, means for driving the spaced apart wheels with the power pack including separate axles between the power pack and spaced apart wheels, and torque limiter means in at least one of the separate axles between at least some of the spaced apart steering road wheels for providing torque differentiation between at least some of the spaced apart steering road wheels rather than rotational differentiation between the same wheels.

2. Structure as set forth in claim 1 wherein the vehicle is a conventional, front wheel drive vehicle including half axles between the front wheel driven by the power pack and the torque limiter means is a single torque limiter positioned in only one of the half axles.

3. Structure as set forth in claim 2 and further including separate means for fixing the torque response of the torque limiter.

4. The method of driving a motor vehicle including a power pack and a plurality of steering road wheels spaced apart at least one of transversely and longitudinally of the vehicle, including separate axles between the power pack and spaced apart steering road wheels, means for driving the spaced apart steering road wheels with the power pack and torque limiter means in the separate axles between at least some of the spaced apart steering road wheels, comprising actuating the power pack to drive the steering road wheels and torque differentiating between at least some of the spaced apart steering road wheels rather than rotationally differentiating between the same wheels.

5. The method as set forth in claim 4 wherein the vehicle is a conventional, front wheel drive vehicle including half axles between the front wheel driven by the power pack and further including positioning the torque limiter in one of the half axles.

6. The method as set forth in claim 5 and further including separately fixing the torque response of the torque limiter.

* * * * *